(12) United States Patent
Hanson et al.

(10) Patent No.: US 7,270,363 B1
(45) Date of Patent: Sep. 18, 2007

(54) GOLF CAR SPLASH GUARD

(75) Inventors: Bradley J. Hanson, North Augusta, SC (US); Richard Krall, Augusta, GA (US); Donald S. Hanson, Jr., Evans, GA (US); Albert Packard, III, Evans, GA (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 11/369,919

(22) Filed: Mar. 7, 2006

(51) Int. Cl.
*B62D 25/14* (2006.01)
(52) U.S. Cl. .................................................. 296/70
(58) Field of Classification Search ................. 296/70, 296/193.09, 203.02, 77.1, 181.2, 80, 82, 296/901.01
See application file for complete search history.

(56) References Cited

U.S. PATENT DOCUMENTS

| | | | |
|---|---|---|---|
| 4,553,274 A * | 11/1985 | Yui .............................. | 4/420.4 |
| 5,297,334 A * | 3/1994 | Johnson ........................ | 296/70 |
| 5,364,159 A * | 11/1994 | Kelman et al. ................ | 296/70 |
| 5,676,216 A * | 10/1997 | Palma et al. ................... | 296/70 |
| 5,904,389 A * | 5/1999 | Vaishnav et al. .......... | 296/37.1 |
| 6,230,832 B1 * | 5/2001 | von Mayenburg et al. . | 296/208 |
| 6,305,733 B1 * | 10/2001 | Rahmstorf et al. ............ | 296/70 |
| 6,779,826 B2 * | 8/2004 | Nakajima ..................... | 296/70 |
| 6,851,742 B1 * | 2/2005 | Kubiak ......................... | 296/70 |
| 7,044,538 B2 * | 5/2006 | Stack ........................... | 296/70 |
| 7,093,883 B2 * | 8/2006 | Tyrer ..................... | 296/100.14 |
| 7,132,145 B2 * | 11/2006 | Shiono ......................... | 428/57 |
| 2002/0101093 A1 * | 8/2002 | Berteaux et al. .............. | 296/70 |

FOREIGN PATENT DOCUMENTS

| | | |
|---|---|---|
| WO | 2004/067360 A1 | 12/2004 |
| WO | 2004/067361 A1 | 12/2004 |
| WO | 2004/068254 A2 | 12/2004 |

* cited by examiner

*Primary Examiner*—Kiran B. Patel
(74) *Attorney, Agent, or Firm*—Harness, Dickey & Pierce P.L.C.

(57) ABSTRACT

A golf car splash guard including: a base portion; a locking flange protruding from the base portion, the locking flange having a locking detail; a wall extending from the base portion at an angle relative to the base portion; a first wire retention device extending from the base portion; and a second wire retention device extending from the wall.

9 Claims, 6 Drawing Sheets

GOLF CAR SPLASH GUARD

FIELD

The present disclosure relates to a method and apparatus for a golf car, light weight utility vehicles, and cargo vehicles.

BACKGROUND

The statements in this section merely provide background information related to the present disclosure and may not constitute prior art.

Golf car instrument panels can be provided with a splash guard. Splash guards can serve a number of purposes, such as to prevent water and other foreign materials from passing through the instrument panel into the passenger area of the golf car. While conventional splash guards are suitable for their intended uses, they are subject to improvement.

SUMMARY

The present teachings provide for a golf car splash guard including: a base portion; a locking flange protruding from the base portion, the locking flange having a locking detail; a wall extending from the base portion at an angle relative to the base portion; a first wire retention device extending from the base portion; and a second wire retention device extending from the wall.

The present teachings further provide for an instrument panel for a golf car including: a main body; an extension portion extending from the main body; a splash guard mounted to the main body; and a flange extending from the splash guard, the flange having a retention detail. The retention detail cooperates with the extension portion to secure the splash guard to the main body.

The present teachings also provide for a golf car including: a front end and a front body at the front end; a rear end and a rear body at the rear end; a seat assembly mounted to the rear body; an instrument panel mounted to the front body, the instrument panel including a main body and a splash guard; a center support mounted to the main body; an extension portion extending from the main body; a flange extending from the splash guard, the flange having a retention detail; and a wall extending from the splash guard, the wall extending from a side of the splash guard proximate the rear end. The retention detail cooperates with the extension portion to secure the splash guard to the main body. The wall is seated within the center support.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
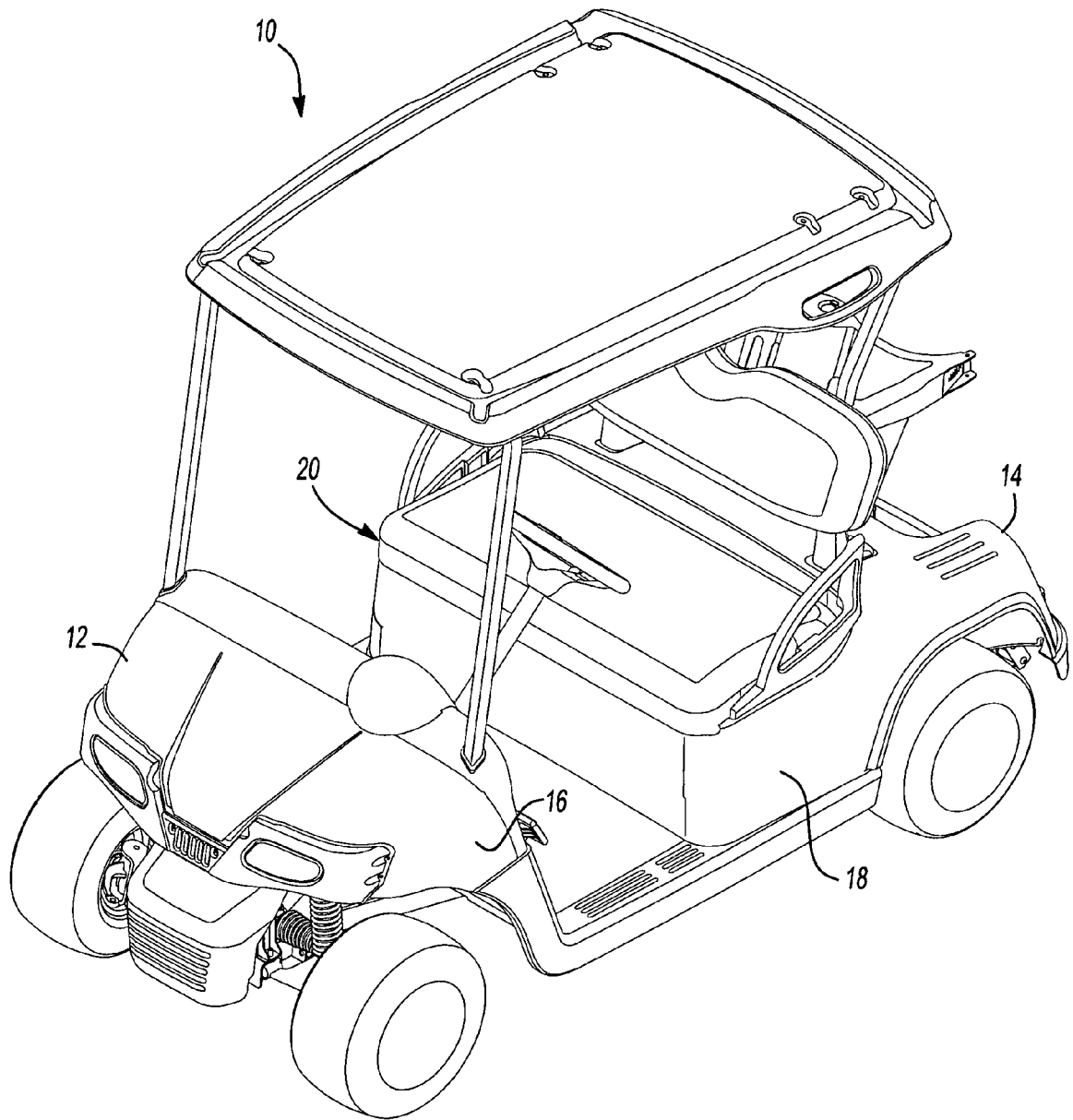
FIG. 1 is a perspective view of a golf car according to various embodiments.

The following description is merely exemplary in nature and is in no way intended to limit the present disclosure, application, or uses. Throughout this specification, like reference numerals will be used to refer to like elements.

A golf car according to the present teachings is illustrated in FIG. 1 at reference numeral 10. The golf car 10 can include a front end 12 and a rear end 14. The front end 12 can be opposite to the rear end 14. The front end 12 can include a front body 16 and the rear end 14 can include a rear body 18. A main seat assembly 20 can be mounted to the rear body 18.

Figure 2:
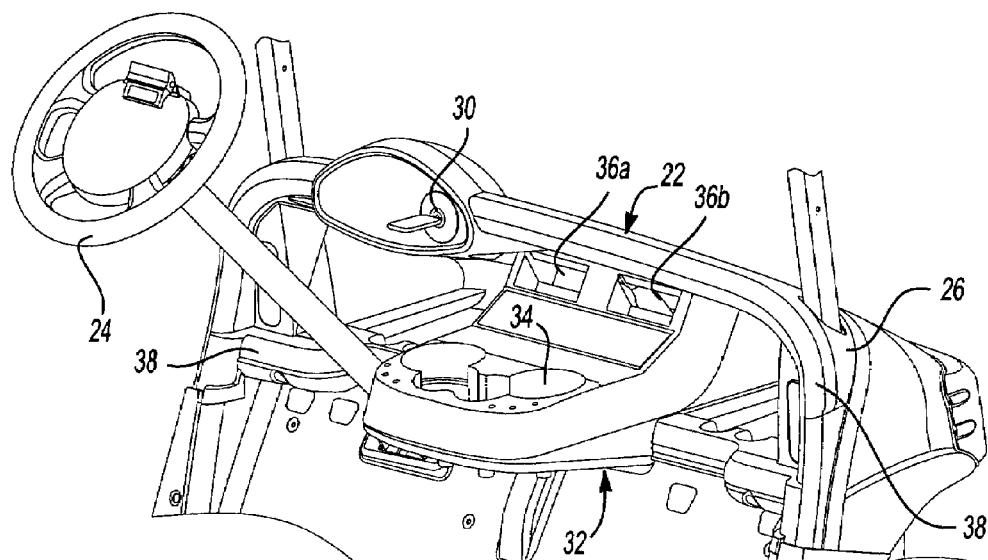
FIG. 2 is a perspective view of an instrument panel of the golf car.
Figure 3:
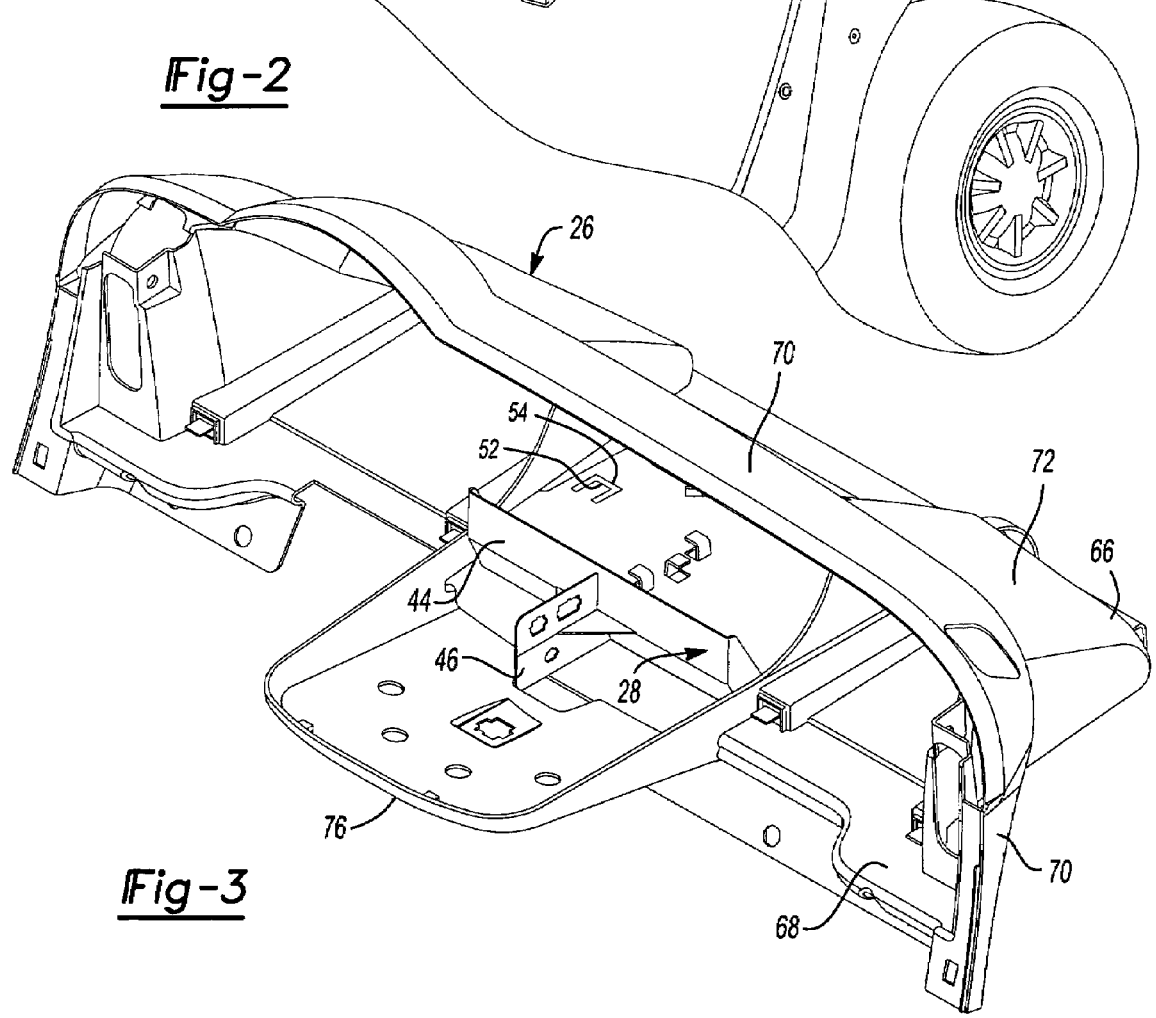
FIG. 3 is a perspective rear view of a splash guard showing its relationship to the instrument panel.
Figure 4:
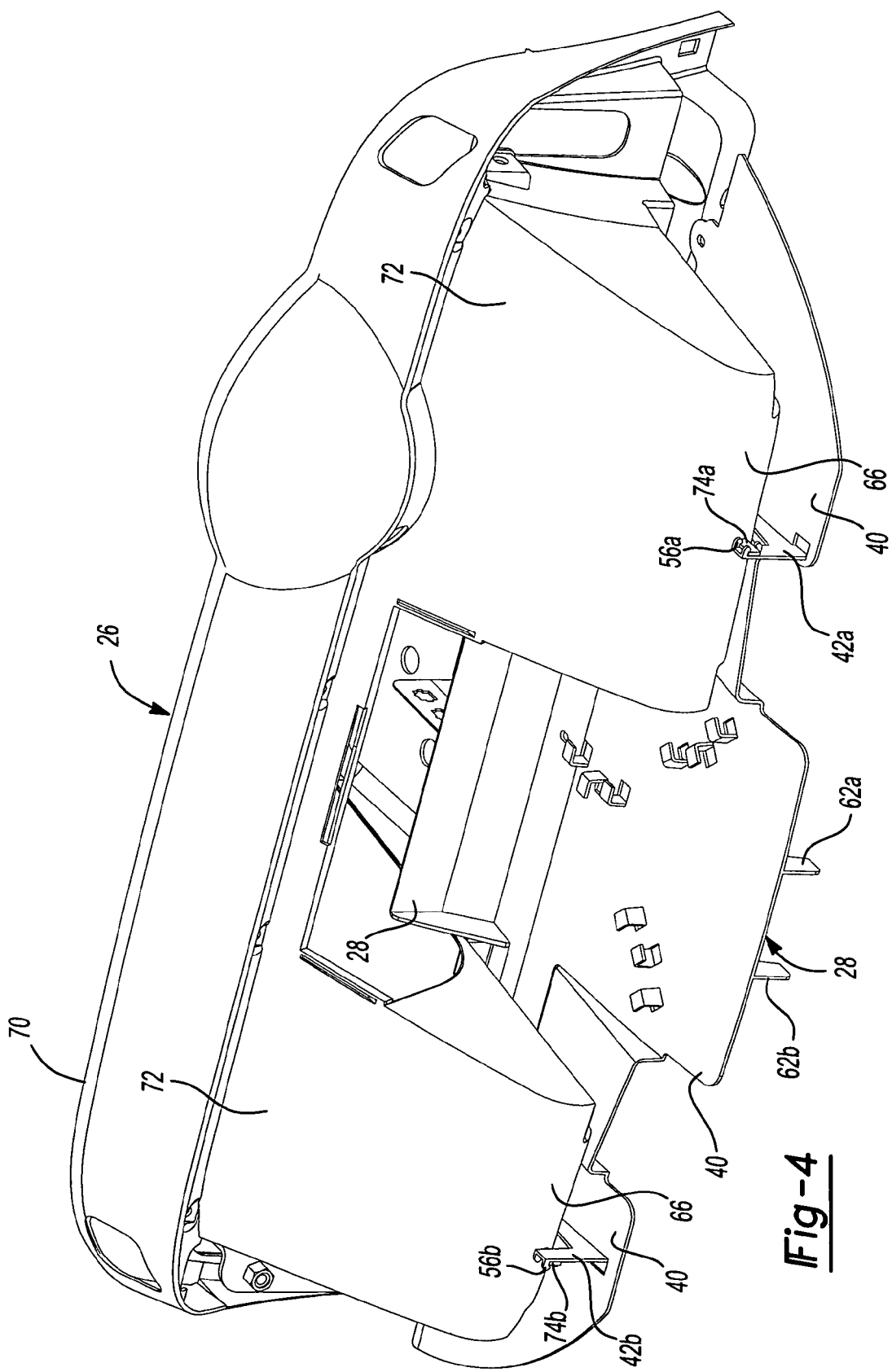
FIG. 4 is a perspective front view of the splash guard mounted to the instrument panel.
Figure 5:
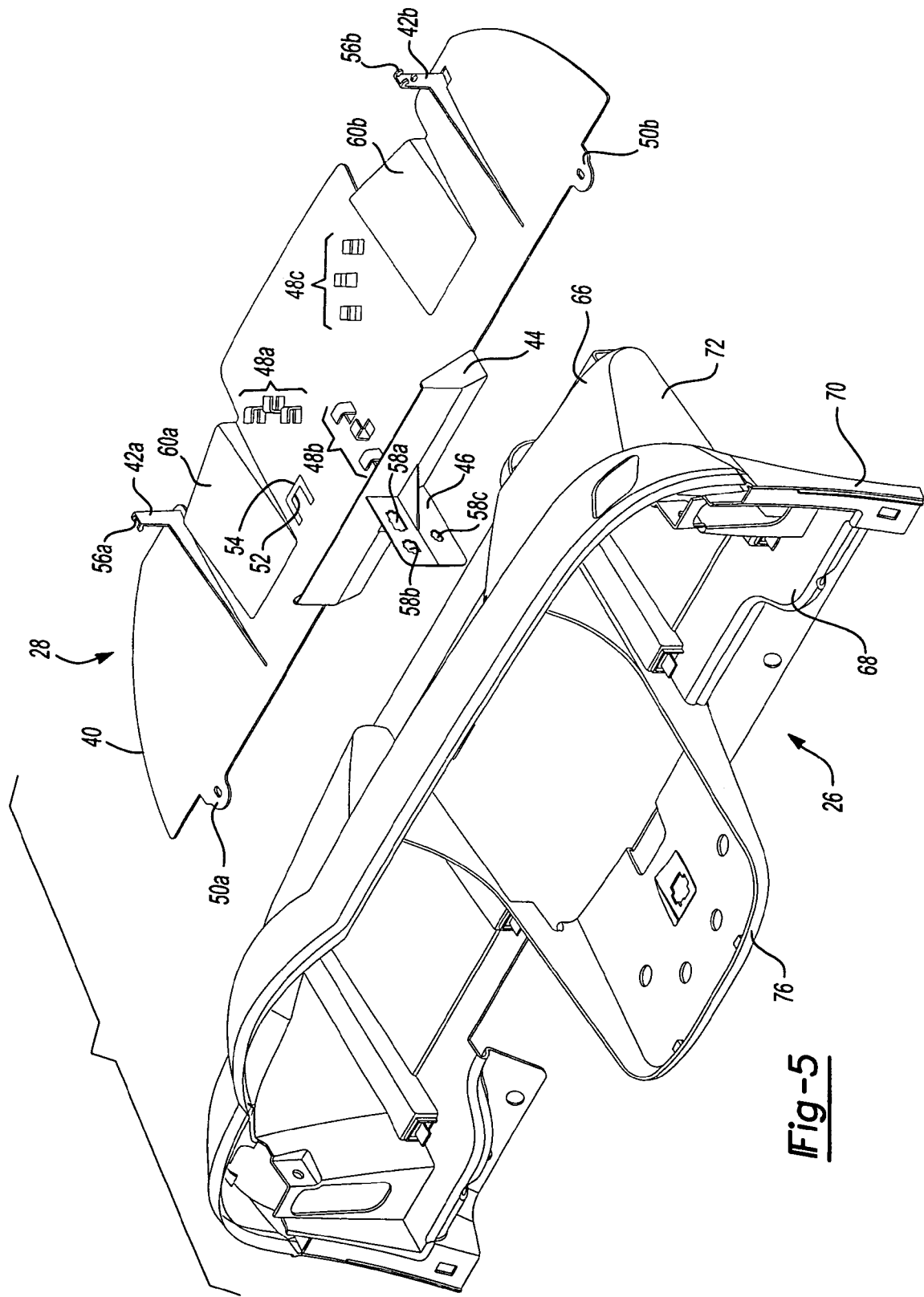
FIG. 5 is an exploded view of FIG. 3.
Figure 6:
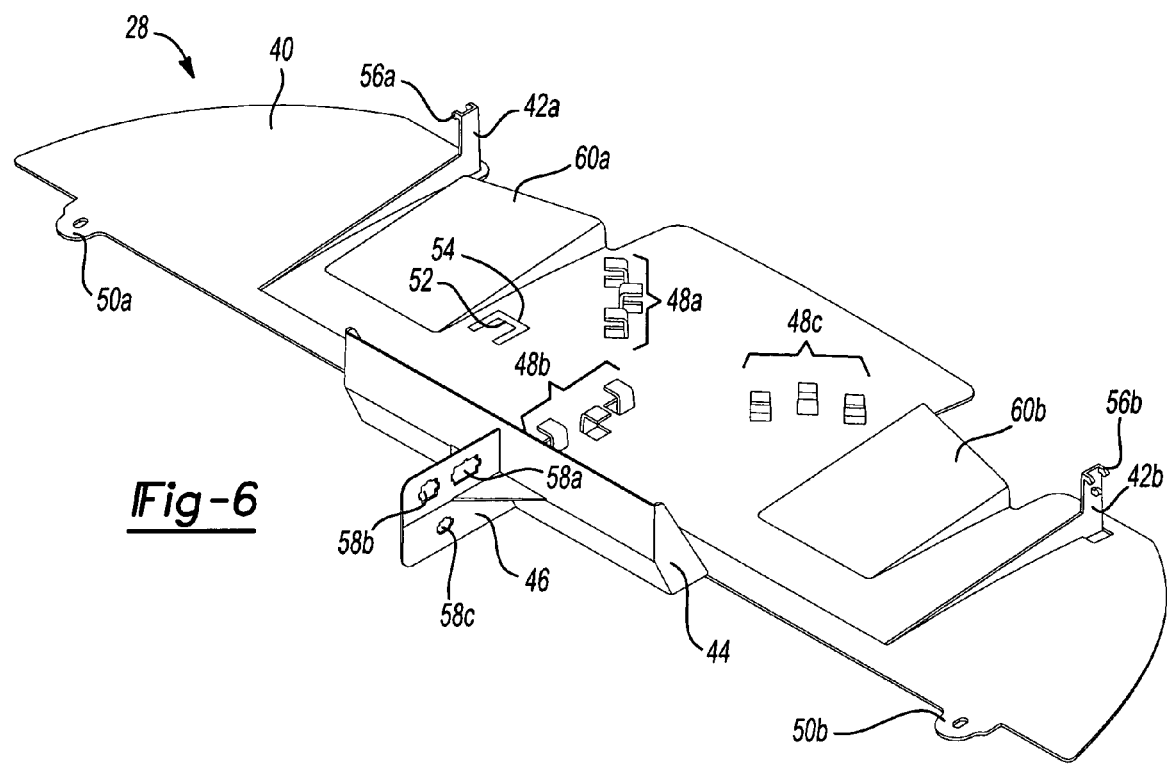
FIG. 6 is perspective rear view of the splash guard.

With additional reference to FIGS. 2-4, the front body 16 can include an instrument panel 22 and a steering wheel 24 extending from the instrument panel 22. The instrument panel 22 can include an instrument panel main body 26, an instrument panel splash guard 28, an ignition switch 30, a center console 32 that can include a cup holder 34 and at least one golf ball retention device 36A and 36B, and an instrument panel trim portion 38.

With additional reference to FIGS. 4-7, the splash guard 28 can include: a base 40; at least one retention flange, such as a first retention flange 42A and a second retention flange 42B; a wall portion 44; a wire harness flange 46; a plurality of retention devices, such as hooks 48; one or more retention apertures, such as a first retention aperture 50A and a second retention aperture 50B; and a flap 52 seated within an opening 54.

The base 40 can be a generally planar base. The first and the second retention flanges 42A and 42B can vertically extend from the base 40 at about a right angle to the base, or any other suitable angle. The first and the second retention flanges 42A and 42B can include retention details 56A and 56B respectively that can protrude from the first and the second retention flanges 42A and 42B. The first and the second retention flanges 42A and 42B can be positioned at opposite ends of the base 40.

The wall portion 44 can extend from the base 40 and can be about perpendicular to the base 40, or positioned at any other suitable angle relative to the base 40. The wall portion 44 can be at a general mid-point of the base 40 and can be between the first and the second retention flanges 42A and 42B. The wall portion 44 can be at an edge of the base 40 that is generally toward the rear end 14 of the car 10 when the car 10 is fully assembled.

The wire harness flange 46 can be mounted to the wall 44 and can extend from the wall 44 at about a right angle to the wall, or at any other suitable angle. The wire harness flange 46 can include one or more apertures 58, such as apertures 58A, 58B, and 58C. The apertures 58A-58C can be any suitable retention device, such as a device for retaining a wire harness.

The hooks 48 can be located generally at a center portion of the base 40, or at any other suitable location on the base 40. The hooks 48 can extend from the base 40 and can be any suitable retention device for retaining, for example, wiring for the golf car 10. As illustrated, the hooks 48 are generally arranged in three groups of hooks 48, such as a first group 48A, a second group 48B, and a third group 48C. The first, second, and third groups 48A, 48B, and 48C can generally be arranged in the shape of a "Y", or any other suitable configuration. Each group 48A, 48B, and 48C can include three hooks 48. The neighboring hooks 48 of each group 48A, 48B, and 48C can be orientated in opposite directions.

The opening 54 can be proximate to the hooks 48. The opening 54 can extend through the base 40. The opening 54 can be defined by a cut-out in the base 40. A portion of the base 40, such as the flap 52, can extend within the opening 54. The flap 52 can be a flexible flap that can be flexed out of the opening 54 to permit access to the opening 54 and can be flexed to be in position within the opening 54 to at least substantially deny access to the opening 54.

The retention apertures 50A and 50B can extend from a perimeter edge of the base 40, such as at an edge of the base 40 proximate to the rear end 14 of the car 10. The apertures 50A and 50B can be any suitable retention device operable to receive a fastening device. The apertures 50A and 50B can also take the form of any suitable device operable to mount the instrument panel splash guard 28 to the instrument panel main body 26.

The instrument panel splash guard 28 can further include at least one angled surface of the base 40, such as a first angled surface 60A and a second angled surface 60B. The first angled surface 60A can be offset from the remainder of the base 40 and can be angled relative to the remainder of the base. The first angled surface 60A can be angled such that the first angled surface 60A is most offset from the remainder of the base 40 at a side of the base nearest the front end 12 of the golf car 10 when fully assembled. The second angled surface 60B can be similar to the first angled surface 60A. Therefore, the description of the first angled surface 60A can also apply to the second angled surface 60B.

Figure 7:
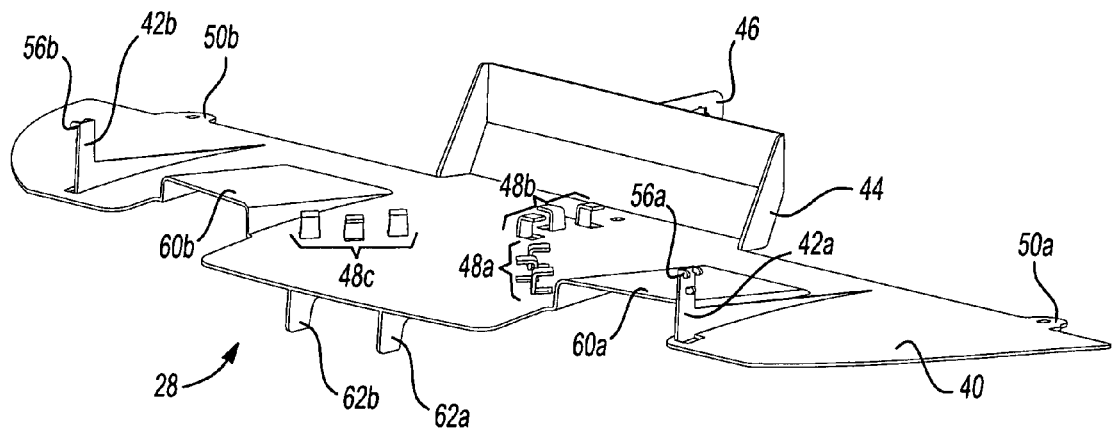
FIG. 7 is a perspective front view of the splash guard.

As illustrated in FIG. 7, the instrument panel splash guard 28 can further include at least one lower flange 62, such as a first lower flange 62A and a second lower flange 62B. The first flange 62A and the second flange 62B can extend from an undersurface of the base 40 as illustrated. The first and the second flanges 62A and 62B can be any suitable flange or fastening device to facilitate the mounting of the splash guard 28 at the front end 12 of the car 10.

With continued reference to FIGS. 3, 4, and 8, the instrument panel main body 26 can include a front side 66 proximate to the front end 12 of the car 10 and a rear side 68 that can be opposite to the front side 66. The instrument panel main body 26 can include a frame 70 and a nose portion 72 that can extend from the frame 70. The nose portion 72 can extend to the front side 66 of the main body 26 and the frame 70 can be proximate to the rear side 68 of the main body 26 when the car 10 is assembled.

Figure 8A:
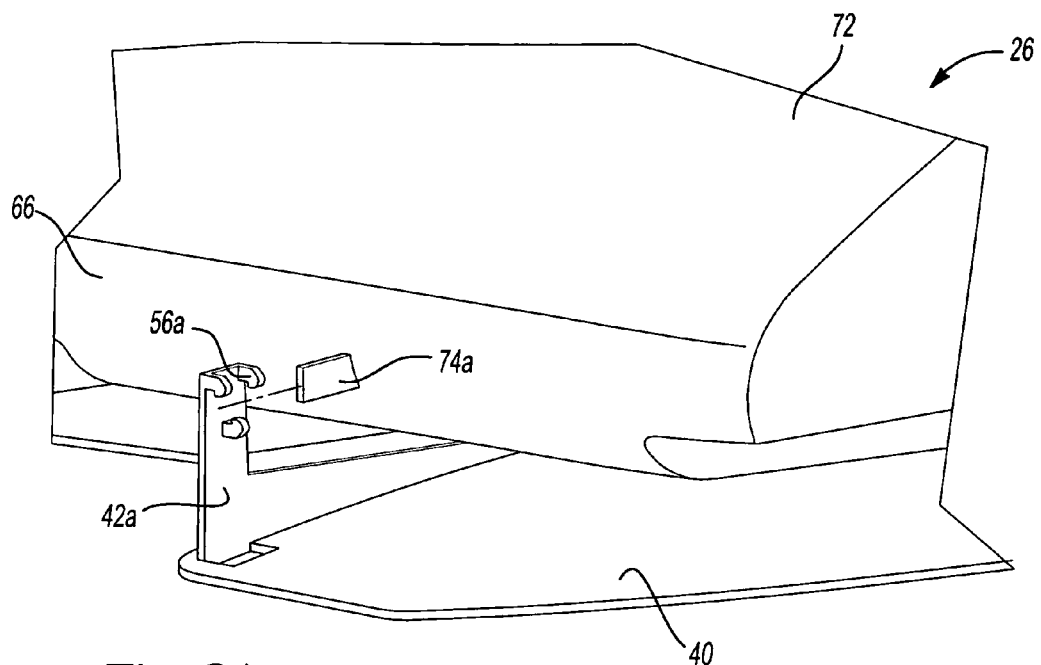
FIG. 8A is close-up view of cooperation between the instrument panel and the splash guard.
Figure 8B:
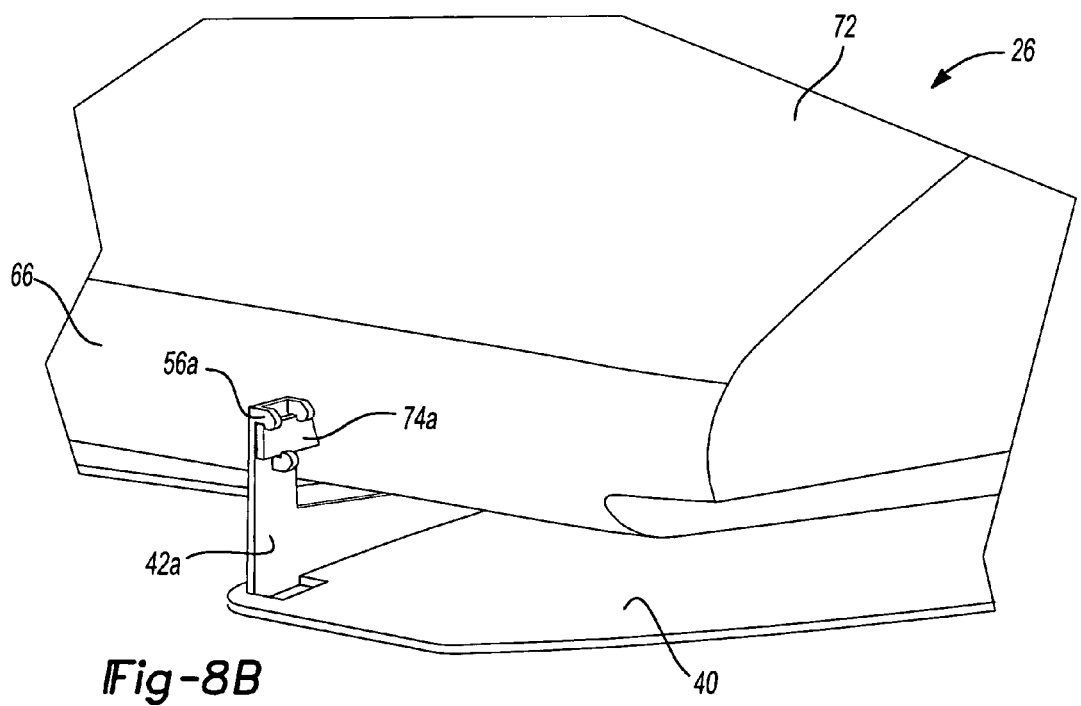
FIG. 8B is a close-up view of the cooperation between the instrument panel and the splash guard.

As illustrated in FIGS. 4, 8A, and 8B, the nose portion 72 can include at least one extension portion, such as a first extension portion 74A and a second extension portion 74B. The extension portions 74A and 74B can extend from opposite ends of the nose portion 72. The extension portions 74A and 74B can also be any suitable fastening device for securing the main body 26 to the first and the second side flanges 42.

As illustrated in FIG. 3, the instrument panel main body 26 can further include a center support 76. The center support 76 can be any suitable support device for supporting the center console 32. The center support 76 can also be sized and shaped to support the wall 44 and the wire harness 46 of the instrument panel splash guard 28. As illustrated in FIG. 3, the center support 76 can be a well or a basin that extends from the nose portion 72 toward the rear end 14 of the car 10. The instrument panel splash guard 28 can include any suitable material. For example, the splash guard 28 can include fiberglass, sheet metal, moldable plastic, plastic composite, and impact molded polypropylene.

Mounting of the instrument panel splash guard 28 to the instrument panel main body 26 will now be described. The instrument panel splash guard 28 can be positioned such that the wall portion 44 is positioned within the center support 76 and extends from one end of the center support 76 to another end, as illustrated in FIG. 3. The splash guard 28 can be mounted to the front side 66 of the main body 26 through cooperation between the extension portions 74A and 74B and the side flanges 42A and 42B respectively. Specifically, the first extension portion 74A can be slid into cooperation with the retention details 56A of the first side flange 42A. The second extension portion 74A can be slid into cooperation with the retention details 56B of the second side flange 42B. The splash guard 28 can be further mounted to the main body 26 using suitable fasteners inserted through the first and second apertures 50A and 50B respectively and into cooperation with the main body 26.

The splash guard 28 can be used for a variety of different purposes. For example, the wall portion 44 can be used to prevent the passage of water and other unwanted foreign materials through the instrument panel 22. The wire harness flange 46 can be used to mount a wire harness for wiring used in the instrument panel 22. Wiring of the instrument panel 22 can also be wrapped around the hooks 48 to secure the wiring. The wiring can be inserted through the aperture 54 to permit passage of the wiring through the splash guard 28.

The description herein is merely exemplary in nature and, thus, variations that do not depart from the gist of that which is described are intended to be within the scope of the disclosure. Such variations are not to be regarded as a departure from the spirit and scope of the disclosure.

What is claimed is:

1. A golf car splash guard comprising:
   a base portion;
   a locking flange protruding from said base portion, said locking flange having a locking detail;
   a wall extending from said base portion at an angle relative to said base portion;
   a first wire retention device extending from said base portion; and
   a second wire retention device extending from said wall.

2. The golf car splash guard of claim 1, wherein said base portion is at least substantially planar.

3. The golf car splash guard of claim 1, wherein said locking flange protrudes from said base portion at a right angle relative to said base portion.

4. The golf car splash guard of claim 1, wherein said first wire retention device comprises a plurality of hooks extending from said base portion.

5. The golf car splash guard of claim 4, wherein said plurality of hooks comprise a first group of hooks, a second group of hooks, and a third group of hooks;
   wherein said first group of hooks, said second group of hooks, and said third group of hooks are arranged in a generally "Y" shaped configuration.

6. The golf car splash guard of claim 1, wherein said second wire retention device comprises a flange extending from said wall.

7. The golf car splash guard of claim 6, wherein said flange extends at a right angle relative to said wall.

8. The golf car splash guard of claim 1, wherein said base portion comprises an aperture extending through said base portion.

9. The golf car splash guard of claim 1, wherein said splash guard comprises at least one of the group of fiberglass, sheet metal, moldable plastic, and plastic composite.

* * * * *